Dec. 17, 1940.                B. AMES                 2,224,945
              SELF-CLEANING ELECTRIC COOKING APPARATUS
                Filed July 27, 1937         3 Sheets-Sheet 1

Inventor
Butler Ames
by Roberts Cushman & Woodberry
att'ys.

Dec. 17, 1940.    B. AMES    2,224,945
SELF-CLEANING ELECTRIC COOKING APPARATUS
Filed July 27, 1937    5 Sheets-Sheet 4

Inventor
Butler Ames
by Roberts Cushman & Woodberry
Att'ys.

Dec. 17, 1940.    B. AMES    2,224,945
SELF-CLEANING ELECTRIC COOKING APPARATUS
Filed July 27, 1937    5 Sheets-Sheet 5

Inventor
Butler Ames
by Roberts Cushman Woodberry
Att'ys.

Patented Dec. 17, 1940

2,224,945

UNITED STATES PATENT OFFICE 2,224,945

SELF-CLEANING ELECTRIC COOKING APPARATUS

Butler Ames, Boston, Mass.

Application July 27, 1937, Serial No. 155,946

17 Claims. (Cl. 219—35)

This invention pertains to the art of cooking and relates more particularly to an improved self-cleaning electrically heated cooker useful for broiling, baking, roasting, frying, boiling, etc. and which, in a size sufficient, for example, to cook in quantity for from four to six persons, requires only the usual house lighting current.

In my copending application for Letters Patent Serial No. 30,667, filed July 10, 1935, I have described cooking apparatus designed to be placed over an external source of heat, for instance upon a gas, electric, or coal range, and so designed and arranged as to perform the desired cooking operation without emission of perceptible odor, fumes or smoke. Among the objects of the present invention is to provide an improved cooker which, like that of my aforesaid application, cooks without evolution of noticeable odor, fumes or smoke, but which is embodied in a self-contained (usually portable) device including an enclosed heating unit, and so designed as to conserve the heat supplied so completely as to make it possible to obtain a glowing radiant temperature (by the use of the ordinary house lighting current) such as is requisite not only for proper broiling, roasting, etc. but also for cleaning the interior surfaces of the device.

A further object of the invention is to provide an improved cooker whose mode of action is such as to produce substantially the same taste, flavor and other characteristics of food which has been cooked over a bed of charcoal or barbecued over a bed of glowing embers.

In cooking at the high temperatures for instance between 1500° and 1700° F., requisite for broiling, roasting, etc., various constituents of the food such as albumens, fats, starches, etc., and which are exuded as juice or as droplets or spatters, tend to carbonize in contact with the highly heated metal of the cooker or the utensils employed in cooking, and such carbonized material, being substantially insoluble in ordinary cleaning solutions, is ordinarily removable only by mechanical methods such as scrubbing, scraping or scouring, all of which are slow and laborious and injurious to the metal parts. A further object of the present invention is to provide a cooker so designed as to be self-cleaning and to constitute effective means for cleaning utensils employed in cooking, the desired result being accomplished by providing a glowing radiant heat of such intensity and so emitted and directed as to consume and dissipate or reduce to the form of an impalpable ash any such carbonized or other materials as are deposited on the metal surfaces during cooking, thereby cleaning all crevices in or between the parts and leaving the metal surfaces bright, clean, thoroughly sterile, and freed from odor.

Since the supply of heat is relatively small (thus avoiding high cost of operation and permitting current to be safely supplied by the ordinary house lighting circuit, without necessitating special wiring), and since some of the heat supplied is used in the elimination of odor, fumes, smoke, etc., it is desirable to reduce, so far as is practicable, one common source of the odors, smoke, fumes, etc. which ordinarily arise during cooking, to wit, those which are evolved from the scorched fat of cooking meat, and a further object of the invention is to provide means for collecting the grease, which is tried out during cooking, under conditions such that it is not overheated or burned but is conducted away while still comparatively cool, that is to say below its boiling or smoking temperature to a point outside of the high temperature zone, and thus conserved, while at the same time greatly reducing the amount of odor or fumes produced and saving the heat energy for cooking the food.

I have discovered that for best results, in certain types at least of cooking, for example in broiling, a substantial portion of the radiant energy supplied should be applied directly to the food at a wave length of the order, for example, of that corresponding to a dull cherry red heat, rather than by supplying all of the energy from an incandescent or short wave length source, and a further object of the invention is to provide means for converting a portion of the radiant energy of the source into heat of about the wave length just indicated as being desirable,—the heat so supplied having a much greater penetrating effect and insuring quicker cooking of the interior of the food than when most or all of the heat is directed against the food at more nearly incandescent wave lengths.

In frying or toasting it is sometimes desirable to observe the cooking operation, and a further object of the invention is to provide cooking apparatus useful for frying, toasting or the like, so designed that the operation may be observed but yet without emission into the surrounding atmosphere of odors, fumes, smoke or the like.

Not only is it desirable to eliminate odors or fumes arising from the broiling, roasting or frying operations, but it is also highly desirable to eliminate fumes or odors such as are evolved in boiling certain foodstuffs, for example smoked meats such as ham,—onions, or vegetables of the cabbage family, etc., and a further object of the invention is to provide a cooker useful in performing the boiling or steaming operation at the normal boiling point of 212° or above but at substantially atmospheric pressure, and without delivery of noticeable odors into the surrounding air and without undesirable browning or burning of the material. A further object is to provide a cooker in which the cooking operation, whether with dry heat as in roasting, or with moist heat as in boiling or steaming, may be performed much more expeditiously than usual, with a better conservation of the juices, mineral contents, natural flavors and vitamins than when food is cooked by ordinary methods, and with a much less consumption of heat than is usually requisite.

A further object is to provide a cooker wherein the food may be subjected to long wave glowing radiant heat, and preferably to a much higher temperature than is usually employed in cooking, whether with dry or moist heat, although at a pressure not exceeding atmospheric pressure; to deliver the heat energy with substantial uniformity over the entire mass of material to be cooked; to provide a cooker of such construction as to permit the cooking of several different substances at the same time even though mixed together or in juxtaposition without contamination of one by the flavor or odor of another, and to provide a cooking device of such external dimensions as to make it available for use in modern small kitchens or kitchenettes.

A further object of the invention is to provide a cooker wherein cooking is carried out at an unusually high temperature, and having a heat insulated base and a cover which may be opened to permit ready introduction of comestibles, and having the cover so connected to the base that it can not readily be wholly separated from the latter; and including provisions for supporting the hot cover, when open, so that it can not come into damaging contact with the surface of the support on which the cooker rests.

A further object of the invention is to provide an improved energy source, in particular an electrical resistance device, preferably designed to emit energy of both short and long wave lengths and to emit energy at different rates, at will, and including an insulating support of refractory material, which becomes highly heated to a glowing radiance and upon which is mounted one or more resistance coils.

Other and further objects and advantages of the invention will be made manifest in the following more detailed description and by reference to the accompanying drawings, wherein

Fig. 3 is a longitudinal vertical section through the device, showing the cover closed and with the parts in readiness for broiling, roasting, baking or the like;

Fig. 6 is a fragmentary front elevation showing the cover in partly open position to facilitate toasting, frying or the like;

Referring to the drawings, the numeral 1 designates the base of the device and the numeral 2 indicates the cover. The base preferably comprises the outer shell 3 and the inner shell 4, both preferably made of sheet metal, and kept in spaced relation by means of studs, bolts or rivets, with interposed spacers 5, which unite them to form a permanent structure. Preferably suitable insulation, for example a sheet 6 of highly polished aluminum, is interposed between the members 3 and 4, the spacers 5 being of appropriate shape to support the insulating member. While a thin plate of polished aluminum or other metal forms a desired insulating means, it is contemplated that other insulating means may be employed, or that the air gap alone between the members 3 and 4 may be relied upon to furnish the desired heat insulation.

At its central part the outer shell 3 is furnished with an upstanding annular boss 7, open at its top, which registers with a similar upwardly directed annular boss 8 formed in the material of the inner shell 4, the boss 8 also being open at its top, providing an opening or passage leading downwardly through the entire thickness of the base, the purpose of which will be described hereinafter.

The outer shell member 3 is furnished with an upstanding peripheral flange 9 having an outwardly directed substantially horizontal rim 10 at its upper edge, the margin of this rim 10 being turned downwardly at 11 to provide stiffness and rigidity.

Figure 7:
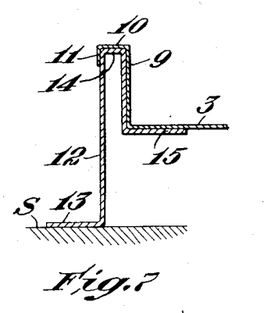
Fig. 7 is a fragmentary vertical section showing a portion of the base of the device and one of the legs which supports the base.

The base is supported upon legs 12 (Fig. 7) each preferably consisting of a length of sheet metal and each having a foot or pad 13 designed to rest upon a suitable support S such, for example, as a table top. Each leg is also preferably provided at its upper part with a substantially horizontal portion 14 designed to underlie the rim 10 of the shell 3, and the leg is further furnished with a tab or ear portion 15 which underlies the main part of the shell 3 and which may be secured to the latter, for example, by spot welding or by rivets. The leg device as thus constructed conducts but little heat from the base to its foot portion 13, so that there is no danger of damaging the surface S on which the device rests. As illustrated, by way of example, the improved cooking device is of substantially elliptical shape in plan, and the base is furnished with four supporting legs symmetrically disposed.

The inner shell 4 of the base is furnished with an upstanding rim 16, preferably having a beaded or otherwise finished edge 17. This edge provides a support for the grease-catching pan 18. This pan is furnished with an upstanding beaded or otherwise finished edge 19 having widely spaced downwardly directed indentations which nest on the edge 17 and support the pan with minimum transmission of heat between pan and base. The pan is downwardly concave, having an opening 20 at its lowest part from which depends a grease delivering pipe 21 designed to pass downwardly through the openings in the bosses 7 and 8 and preferably through the entire thickness of the base so as to deliver any grease which collects in the pan at a point outside of the housing and preferably into a receptacle 22 which may be disposed in the space beneath the outer shell 3 of the base. Preferably the pan 18 is of aluminum.

The cover 2 comprises a substantially vertical side wall portion and a dome-shaped top. The side wall portion preferably includes the inner and outer shells 23 and 24, which may be made of any suitable material, the outer shell, for example, being of ordinary sheet steel finished in any desired way, or of stainless steel, while the inner shell 23 may be of aluminum or other non-oxidizing material, if preferred. These inner and outer shells are held in spaced relation, and in the space between these shells there may be disposed heat insulating material such, for example, as a thin sheet 26 of polished aluminum, or any other desired type of insulation, or, if preferred, the space may be left empty and the insulation effect furnished only by the air between the shells.

When the cover is closed and the pan 18 is in place, the lower edge 23ᵃ of the inner shell 23 of the cover rests upon the outer margin of the pan 18 just inside of the rim 19 of the latter. The space between the shells 23 and 24 is closed near its bottom for example by overlapping flanges, as indicated at 24ᵃ so that there can be no circulation of air upwardly between the shells. At their upper ends the shells 23 and 24 are permanently united by a closure ring 27 which may be secured to the respective shells by welding, pressed seams, rivets or the like,—the ring 27 preferably having an inwardly directed flange 28 on which rests the marginal portion 29 of the inner shell 30 of the domed top,—the parts 28 and 29 being united by welding, rivets or in any other suitable manner. The inner shell 30 of the domed top preferably is of substantially parabolic transverse section, as illustrated more particularly in Fig. 4. The domed top also comprises the intermediate shell 31 (which may be a thin sheet of polished aluminum for insulating purposes) and the outer shell 32, the shell 31 having an outwardly directed substantially horizontal flange 33 whose outer edge engages the beaded edge 34 of the marginal flange 35 of the shell 32. The ring member 27 is secured to the flange 33 by means of bolts or rivets 36 with interposed spacers 37, the spacers providing a vertically narrow outlet slot 38 extending peripherally around the cover substantially at the junction of the domed top with the side walls, and which freely communicate with the space between the shells 30 and 31. This outlet slot 38 may well be of the order of one-fourth inch in vertical height. The outer shell 32 of the domed top may be secured to the flange 33 by welding, rivets, or in any other suitable manner, the main bodies of the several shells 30, 31 and 32 being spaced apart to provide air insulation. If desired, additional insulating material 41, such for example as polished aluminum foil, rock wool, or the like, may be interposed in the space 40 between the shells 31 and 32.

Figure 8:
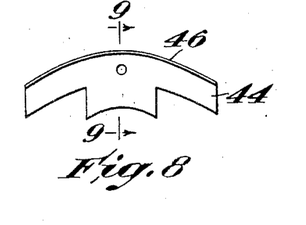
Fig. 8 is an elevation of one of the baffle or grid plates constituting the fume and odor eliminating device.
Figure 9:
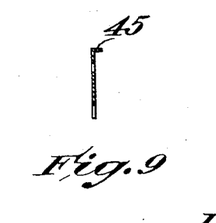
Fig. 9 is a section substantially on the line 9—9 of Fig. 8.

The inner parabolically curved shell 30 preferably is aluminium and is provided with an opening 43 at its top or zenith portion, such opening being designed to receive the device 43 for consuming or destroying smoke, fumes, or odor evolved during the cooking operation. This device 43, as illustrated, comprises a series of thin, substantially vertical, parallel, spaced metal plates 44 (Figs. 8 and 9), these plates preferably being of aluminum and each having a substantially horizontal flange 45 at its upper edge. The upper edge 46 of each plate preferably is parabolically curved, substantially following the contour of the shell 30 and the plates are held in spaced relation by means of a bolt 48 and intervening spacers, so that in the assembly the several flanges 45 close the spaces between the adjacent plates and collectively form a parabolic reflector at the top of the grid-like fume-destroying device. The lower portions of the plates 44 project downwardly through the opening 43 and the endmost plates are furnished with flanges 49 by means of which the grid device is permanently secured to the inner shell 30.

Figure 10:
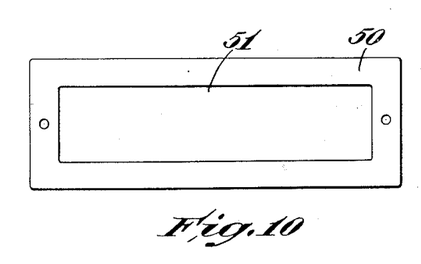
Fig. 10 is a bottom view of an energy-transforming plate forming a desirable element of the structure.

Just below the central part of the shell 30 there is preferably arranged a plate 50 (Fig. 10) which may consist of Monel metal or other alloy having a copper constituent and which, after initial subjection to the temperatures which exist in the apparatus during cooking, becomes of a relatively dark color and thus acts to absorb energy of short wave length and to emit such energy in the form of longer waves. This plate 50 has a central aperture 51 which substantially registers with the opening 42 in the shell 30,— the plate 50 being secured to the shell 30 by means of suitable rivets or bolts with intervening spacers so that the plate 50 is spaced from the inner surface of the shell 30 a distance, for example, of the order of one-eighth inch.

Below the opening 51 and substantially at the focus of the parabolic curvature of the inner shell 30, there is disposed a source 52 of radiant energy. This source, as here illustrated, preferably comprises a tubular porcelain core 53 the outer surface of which is provided with interrelated helical grooves in which are disposed electrical resistance coils 54 and 54a. The porcelain core 53 is provided at its opposite ends with brackets 55 by means of which it is permanently secured to the inner shell 30. The source 52 is of the type fully disclosed and described in my copending application Serial No. 239,613, filed November 9, 1938.

The resistance device in a preferred form is designed to emit energy at different rates according to the will of the user, and for this purpose comprises two or more independent coils whose termini are secured to the bracket 55 and connected (by means of conductors, not shown, leading through the spaces between the shells of the cover) to terminal posts 56, 57 and 58 mounted upon an insulating support on the outer shell 24 of the cover, preferably near the lower part of the cover where they will not be subjected to undue heat radiated from the apparatus during use. The three posts 56, 57 and 58, with the connections and the coils 54, may, for example, be so arranged that by connecting the posts 56 and 57 to a source of electrical current, a low heat may be produced; by connecting posts 57 and 58, an intermediate heat may be produced; while by connecting posts 56 and 58 a high heat may be produced. Obviously a greater or lesser number of heats may be provided for as desired.

As above suggested, the apparatus is designed for use with ordinary house-lighting current at 110 volts and so as to operate on from 1000 to 1200 watts. Thus the apparatus may be used by plugging into the ordinary service outlet without necessitating special wiring and without endangering the ordinary insulation used in house wiring circuits.

Figure 1:
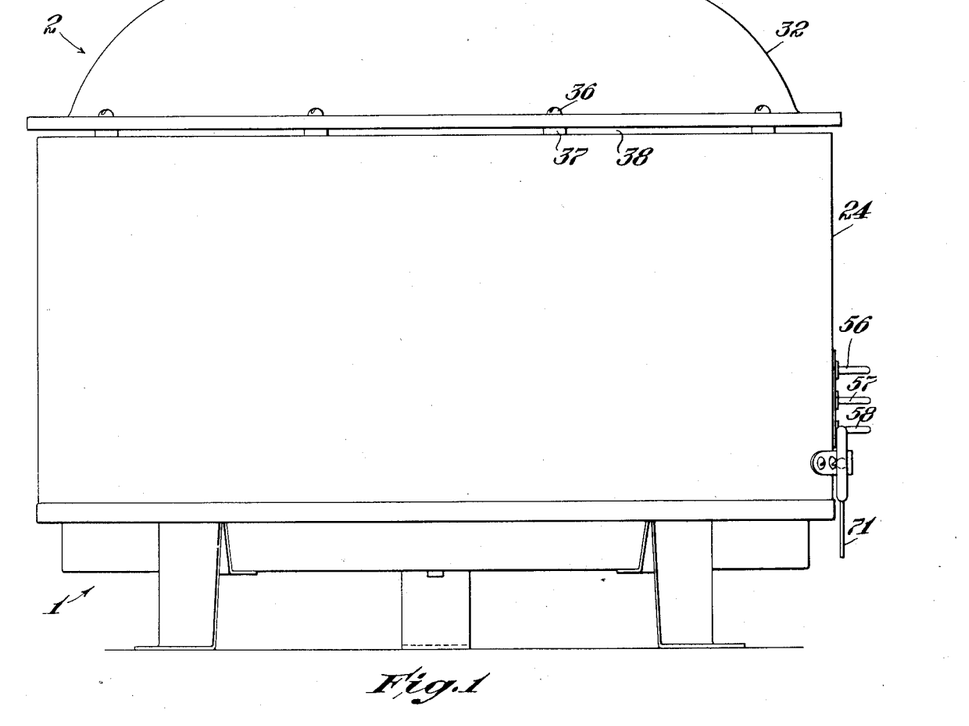
Fig. 1 is a front elevation of a preferred embodiment of the device.
Figure 2:
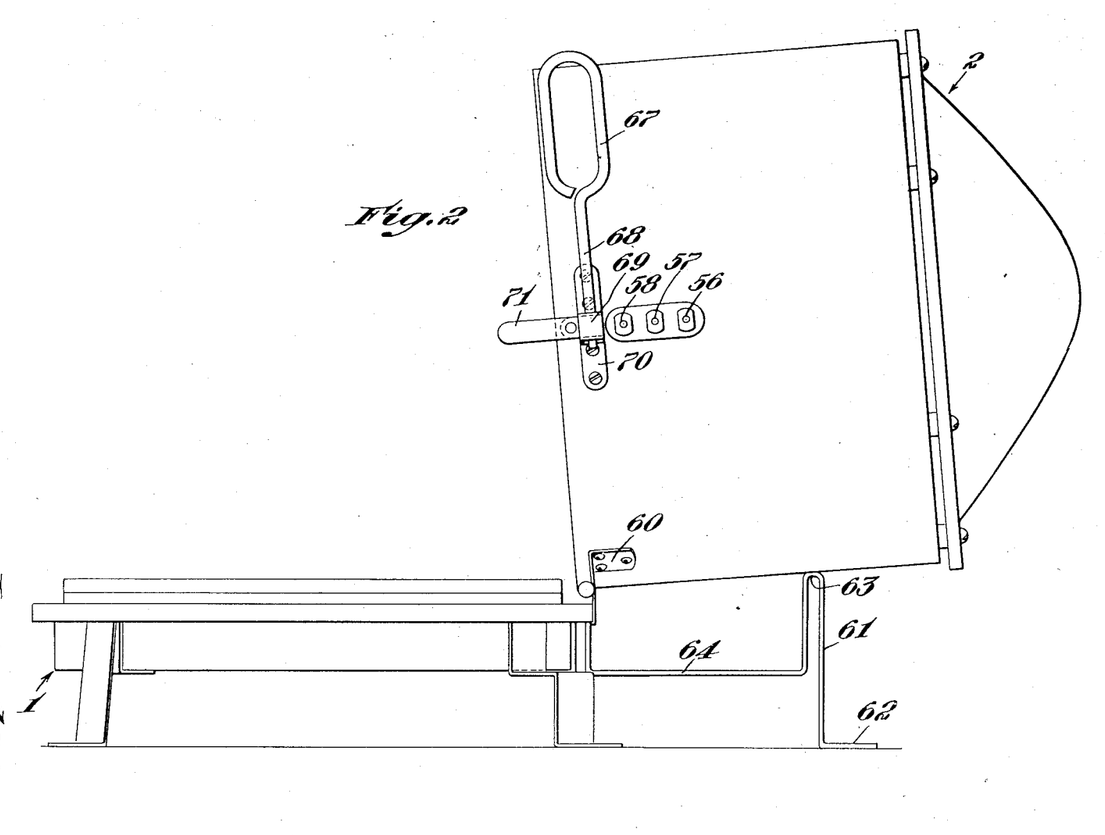
Fig. 2 is an end elevation of the device showing the cover fully open.

The cover is preferably connected to the base by hinges, so that it can not be wholly removed from the base, as by means of hinges 59 and 60 (Fig. 5) disposed at the rear of the device, with the hinge axis parallel to the long axis of the elliptical base, the hinges being so designed as to avoid binding even though their axes are not exactly aligned. In order to support the cover in open position, as shown in Fig. 2, without straining the hinges or without causing injury to the table or other support upon which the apparatus rests, it is preferred to provide a cover supporting bracket 61 (Figs. 2 and 4), preferably of sheet metal, having a foot 62 and a U-shaped bend at 63 which engages with and forms the immediate support for the cover. The bracket is furnished with a substantially horizontal member 64 having an upwardly U-shaped bend 65 at its forward part, said bend 65 being disposed in contact with the under side of the rim 10 of the base member and having the ear or flap 66 which is secured to the base member. If desired, the cover supporting bracket may be removably attached to the base, for example by the use of a thumb screw or the like, to facilitate packing the cooker for shipment or storage. This form of supporting bracket avoids excess conduction of heat from the base or cover to the foot 62 and the support on which it rests.

Figure 3:
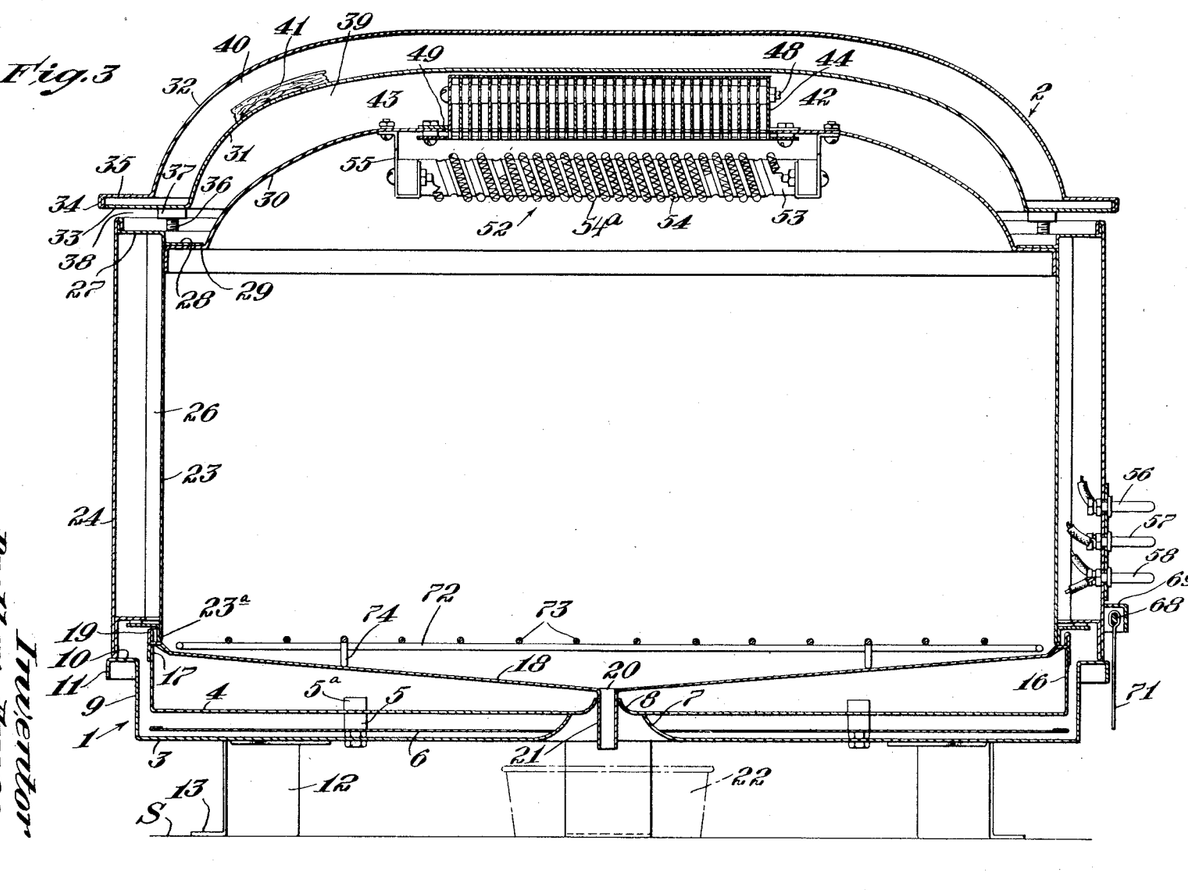
Figure 5:
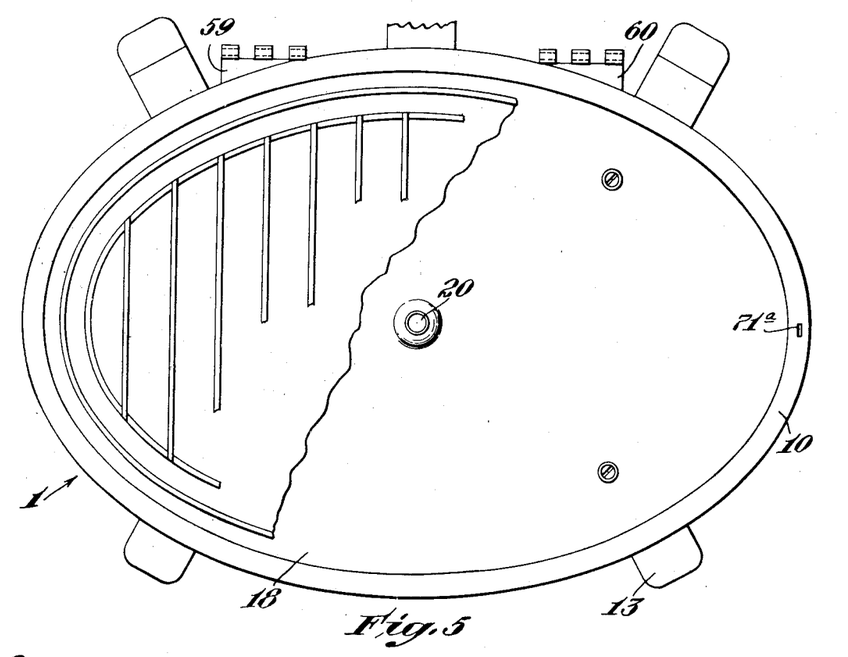
Fig. 5 is a fragmentary plan view showing the base of the device (with the cover removed) and with the food-supporting rack broken away to show the grease catching pan.
Figure 6:
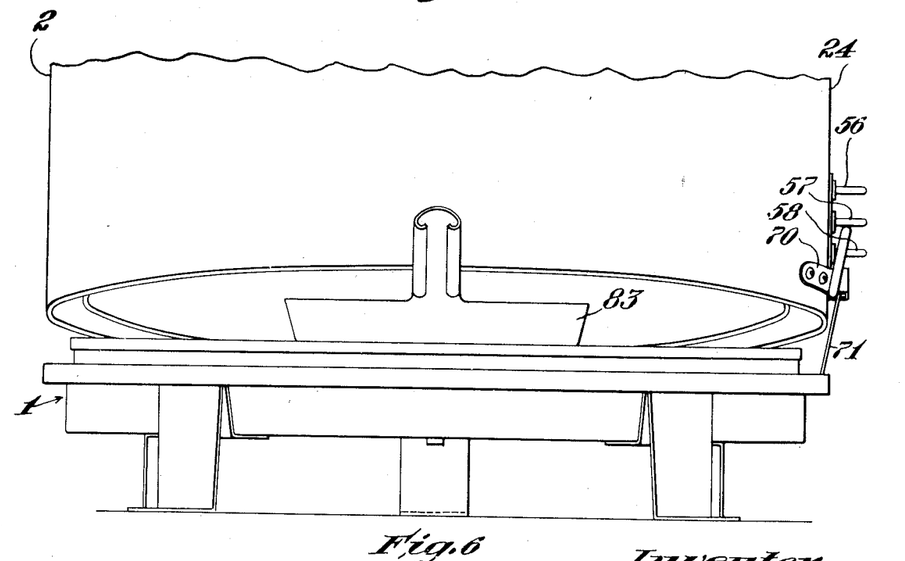

To enable the user to open or close the cover conveniently, a handle 67 is provided, such handle having the shaft portion 68 (Fig. 2) which is arranged to turn in a normally horizontal bearing in a lateral portion 69 of a bracket 70 secured to one end of the cover, preferably just below the terminal posts 56, 57 and 58. Preferably the shaft 68 is furnished with the downwardly directed brace member 71 which normally stands substantially vertical, as shown in Fig. 3. However, when it is desired to hold the cover in partly open position, as shown in Fig. 6, the handle may be turned about the axis of its shaft 68, thus swinging the lower end of its brace 71 inwardly, until its extreme lower end may be caused to rest in a small opening or depression 71ᵃ (Fig. 5) in the rim hem of the base member. With the parts in this position, the cover is held partly open so that cooking vessels may be inserted beneath it.

When broiling, roasting or the like is to be done, it is preferred to place a rack 72 upon the pan 18, the rack having transverse bars 73 and legs 74 which rest upon the upper surface of the pan 18.

Figure 4:
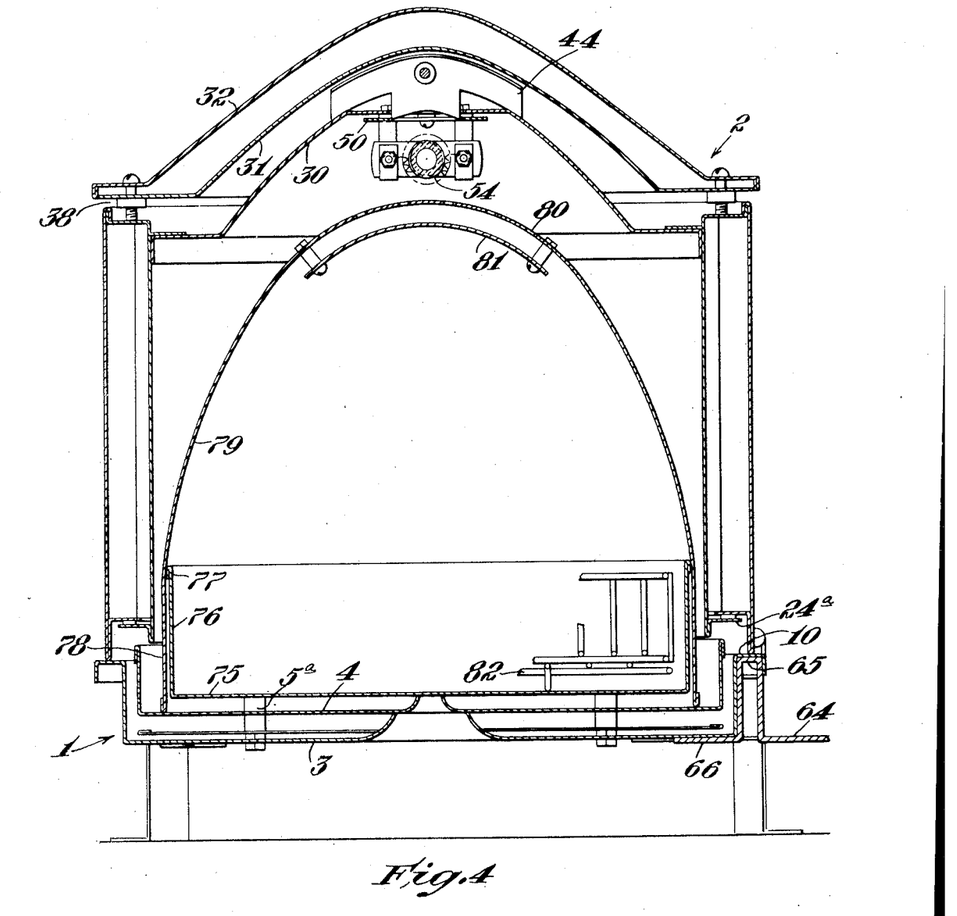
Fig. 4 is a vertical section on a plane substantially at right angles to that of Fig. 3.

When it is desired to use the device for boiling, the rack 72 and the pan 18 are removed, as shown in Fig. 4, and a boiling pan 75 is disposed to rest upon the spaced supports 5ᵃ which project upwardly from the upper surface through the base member 4. This pan 75 has an upturned rim 76, preferably finished by an edge bead 77, and is furnished with a domed hood or cover comprising the lower, substantially vertical wall portion 78 and the curved top portion 79. At its upper part this cover or hood is furnished with one or more openings 80 and beneath these openings there is arranged a heat baffle plate 81 spaced from the inner surface of the hood and secured to the latter by rivets or the like with intervening spacer members. Within the boiling pan there preferably is arranged a rack 82 designed to hold a wire basket or baskets in which vegetables or other articles to be cooked may be placed,—the rack having suitable legs so that the articles, while being cooked, do not actually come in contact with the water in the pan.

When the device is to be used for frying or toasting, for example, the cover is partly opened, as shown in Fig. 6, and the frying pan 83 or toaster or other suitable container may be slipped beneath the forward edge of the cover so that its contents will be exposed to the radiant heat within the cover, although readily observable by the person who is performing the cooking operation.

In using the device for roasting, broiling or the like, the user first removes the pan 18 and the rack 72 and, after closing the cover, turns on the electricity and allows the device to become preheated for a period, for example, of the order of five minutes. The meat to be broiled, for example, is placed upon the rack 72 and the latter is placed on the pan 18, and at the end of the preheating period the cover is opened and the pan with its rack and the meat thereon is introduced and the cover is closed. The heat energy which initially emanates from the incandescent source 52 is in the form of short wave lengths of the order of light wave lengths and much of this energy is directly reflected by the parabolic inner surface of the shell 30 so as to be directed downwardly and substantially uniformly over the entire area of the rack 72 and the material resting thereon. However, a portion of this energy passes upwardly through the opening in the plate 50 and causes the grid 43 to become highly heated. Another portion of the radiant energy impinges upon the dark colored surface of the energy-transforming plate 50, if used, and is again emitted by the latter but in the form of longer wave lengths, for example, wave lengths corresponding to a dull cherry red heat. These heat rays of long wave length have been found to have a highly penetrating effect upon meat or other material being cooked, so that the interior of the meat is rapidly cooked at the same time that the outer surfaces are being seared by the intense radiations from the white or polished surface of the inner shells 30 and 23. The cooking operation thus progresses far more rapidly than is usual, so that chops, thick steaks or the like may be cooked in a period, for example, of the order of seven or eight minutes while preserving substantially all of the juices and natural flavor.

When the meat is first introduced into the hot cooker, the grease soon begins to drop into the pan 18 and run out through the opening 20 and pipe 21 and is caught in the receptacle 22, thus being conserved in unscorched form, while at the same time removing it from the zone of high heat so that it is not burned and caused to smoke which would obscure the free flow of radiant energy within the cooking chamber.

Such small amount of grease as does remain within the heated zone and which is caused to smoke or to be converted into a greasy vapor rises to the upper part of the domed portion of the cover and passes up through the opening 51 into the spaces between the highly heated plates 44. It has been found as a matter of actual fact that the provision of these highly heated plates in some way, possibly by a catalytic action, substantially eliminates all odors or smoke (perhaps by breaking down into simpler forms the constituents of the smoke, fumes, or odor-forming substances) so that whatever warm gaseous substances may eventually find their way out between the plates 44 and through the outlet passage 38 are substantially colorless, odorless, and have no greasy or other unpleasant effect, the only material deposited upon a cold surface held adjacent to the outlet slot 38 being substantially clear water.

After the cooking operation has been completed, the cover is opened long enough to remove the meat from the rack 72 and the cover is then closed and the current allowed to flow for a further period, for example, ten to twenty minutes, whereupon if the cover be opened, it will be found that the entire inner surface of the apparatus, including the rack and pan and any utensils which may be used during the cooking operation, or which may have been placed in the cooking chamber for cleaning, have been completely and thoroughly cleaned so that no deposits of carbonized fat or other materials remain to be removed by scrubbing or other similar operations. The interior metal surfaces are found to be bright and clean, free from odor, and in readiness for the performance of another cooking operation without necessitating any further cleaning by the user.

For steaming, a small amount of water is placed in the pan. The hood or cover 79 is closed and the radiant heat from the inner surfaces of the cooker is received by the hood and conducted downwardly thereby heating the pan 75 and raising the water therein to a steaming temperature. The baskets of material to be cooked having been placed upon the rack 82 in the pan and covered by the hood, the steam within the hood eventually reaches a superheated temperature, although the pressure within the hood never substantially exceeds atmospheric pressure. Part of the steam passes down between the lower part of the cover and the rim of the pan into the space below the pan and thus helps to heat the water in the latter. In order to prevent undesired browning or burning of the upper surfaces of materials while being boiled, the heat baffle plate 81 is provided, the vapors which arise during the boiling passing between the plate 81 and the surface of the hood and thus serving in some measure to cut off the direct passage of heat rays.

By thus cooking the material in an atmosphere of superheated steam at atmospheric pressure, it is found that the cooking operation proceeds with very great rapidity, that the substances being cooked, even though of diverse character and though ordinarily of a type which emit distinct odors during cooking, do not absorb flavors or odors one from the other, while no appreciable odors are evolved from the cooking apparatus, the odor-forming substances apparently being broken down and destroyed in passing through the grid 43.

When frying is to be done, the apparatus is arranged as shown in Fig. 6 and the material to be cooked is introduced by placing it in a pan 83 or other container and slipping it beneath the cover so that the contents of the pan are exposed to the radiant heat within the cover. Although fumes may be evolved during this operation, such fumes pass up into the domed top of the cover and, coming in contact with the grid 43, are broken down into odorless invisible substances which pass out through the peripheral delivery slot 38 without causing any annoyance in the near vicinity of the apparatus. However, during the frying operation as just described, the cook may observe the operation so that, for example, when frying eggs or the like the proper period of cooking may readily be determined.

While a certain desirable construction has herein been illustrated and described, and while certain desirable utilities and modes of operation of the apparatus have been suggested, it is to be understood that the principle of invention is capable of embodiment in other specific types of apparatus, and that the invention is not to be regarded as limited to the specific construction here illustrated, while it is further obvious that variations in the procedure above suggested for using the apparatus in cooking may be made without in any way departing from the spirit of the invention.

I claim:

1. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that said fume-eliminating means comprises a narrow hot walled channel through which gaseous substances evolved during cooking are constrained to pass slowly in intimate contact with the walls of the channel on their way to the end of the outlet passage, the walls of said narrow channel being so located as to be highly heated by said energy source.

2. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that the fume-eliminating means comprises a plurality of spaced closely adjacent metallic surfaces forming a plurality of channels whose walls are highly heated by said energy source, said surfaces being so arranged that smoke and odoriferous products of cooking pass between them.

3. A cooker of the class described comprising a housing within which is a cooking chamber having an outlet opening, a source of radiant heat energy within the cooking chamber, and fume and odor-eliminating means associated with said opening, said fume and odor-eliminating means comprising a plurality of thin closely spaced parallel metal plates between which all gaseous products on their way to the outlet opening must pass, said plates being so disposed with reference to the energy source as to become highly heated.

4. Cooking apparatus comprising a heat-insulated housing substantially closed at its bottom and having an outlet opening at its top, the inner surface of the top being of substantially parabolic curvature, a source of radiant heat disposed substantially at the focus of said parabolic curvature, and a fume-consuming device disposed in the outlet, said device comprising a plurality of substantially parallel plates, the spaces between said plates being closed at their tops by means forming a substantially parabolic reflector, the lower edges of the plates also being parabolically curved.

5. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that the inner surface of the cooking chamber is of a material which is of low heat-absorptive capacity.

6. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber and fume-eliminating means between the entrance and exit ends of said outlet passage, characterized in that the energy source and adjacent parts are so designed and arranged as to emit long wave radiant energy of high penetrative character similar to that emitted by a bed of glowing charcoal.

7. Apparatus of the class described comprising a housing including a base and a relatively movable cover, the base supporting a grease pan and the cover having a heat source in its upper part, the cover having an outlet opening immediately above the heat source, a plurality of metallic plates arranged to be heated by said source and to be impinged upon by fumes or odoriferous substances escaping through said opening, and an energy-transforming element adjacent to said opening.

8. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that the heat source when energized with usual house-lighting current is capable of emitting heat of such intensity as to consume organic deposits upon the inner surface of the apparatus thereby to permit cleansing the apparatus solely by the effect of radiant energy.

9. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that the inner wall of the cooking chamber is of parabolic curvature with the source of energy at the focal point of such curvature.

10. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in having a grease-collecting pan within the lower part of the cooking chamber, and means so supporting the pan as to minimize conduction of heat between the pan and other parts of the apparatus.

11. Apparatus of the class described comprising a housing including a base and a relatively movable cover, the base including spaced inner and outer shells with interposed insulating material, legs supporting the base, a pan removably mounted upon the base, said pan being downwardly concave and having a grease delivery pipe leading downwardly from its lowest point, the base having an opening for the passage of said pipe, and an electrical heating unit in the upper part of the cover.

12. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in that the housing includes a base and a domed cover defining the cooking chamber, the cover comprising spaced inner and outer shells and means so connecting the shells as to minimize the transfer of heat from the inner shell to the outer shell by conduction.

13. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged as to prevent appreciable ingress and circulation of air upwardly through the cooking chamber, and fume-eliminating means between the entrance and exit ends of said outlet passage, characterized in having a cooking pot disposed within the cooking chamber, said pot having a cover, the upper part of the cover being in heat-transferring relation to the source of glowing radiant energy and the lower portion of the cover being closely adjacent to the sides of the pot.

14. A cooker of the class described comprising a base and a domed cover defining a cooking chamber, said cover comprising an inner shell and an outer shell and an electrically energized source of radiant heat within the cover, a boiling pot disposed within the cooking chamber, said pot having a cover which is a good heat conductor, the upper part of the cover being in heat-transferring relation to the source of glowing radiant energy, and the lower part of the cover being closely adjacent and substantially parallel to the sides of the boiling pot.

15. Cooking apparatus of the kind comprising a heat-insulated housing having therein a cooking chamber provided at its lower part with means for draining away liquids which exude during cooking, an electrically energized source of glowing radiant energy located in the upper part of the cooking chamber, means providing an outlet passage leading from the upper part of the cooking chamber to a point at the exterior of the housing, the parts being so proportioned and arranged to prevent appreciable ingress and circulation of air upwardly through the cooking chamber, fume-eliminating means between the entrance and exit ends of said outlet passage, characterized in having a cooking pot disposed within the cooking chamber, said pot having a cover, the upper part of the cover being in heat-transferring relation to the source of glowing radiant energy, and means within the upper portion of the pot cover operative to shield the food within the pot from a too intense radiation from the heat source.

16. Apparatus of the class described designed for cooking by radiant energy and comprising a heat-insulated housing normally substantially closed at its bottom and including a base and a cover, the cover having therein a source of radiant heat at its upper part, an outlet opening above said source, a boiling pan normally supported by the base, and a removable hood normally covering the pan, the hood having a heat baffle in its upper part to reduce the transmission of radiant heat to the contents of the pan.

17. Apparatus of the class described comprising a heat insulated housing normally substantially closed at its bottom and including a base and a cover, the cover having therein a source of radiant heat in its upper part, and an outlet opening above said heat source, a fume and odor-eliminating means associated with said outlet, a boiling pan mounted upon the base, and a hood normally covering the pan, said hood having a heat baffle in its upper part to reduce the transmission of radiant heat to the contents of the pan, the hood having openings therethrough above said baffle.

BUTLER AMES.